United States Patent Office 2,916,529
Patented Dec. 8, 1959

2,916,529

PROCESS FOR PREPARING INDANS

Robert A. Sanford, Homewood, and Stephen M. Kovach, Park Forest, Ill., assignors to Sinclair Refining Company, New York, N.Y., a corporation of Maine No Drawing. Application September 25, 1957
Serial No. 686,034

4 Claims. (Cl. 260—668)

The present invention relates to an improved process for preparing indan and its homologs from o-ethyl toluene and its homologs. More specifically, the present process pertains to an improved method for the dehydrocyclization of alkylbenzenes having an o-methylethyl configuration to their corresponding indans.

The production of indan and its homologs has commercial interest in that the indans are useful as intermediates in the production of the unsaturated indenes which are in turn of value since they are readily polymerized to yield valuable resins. Briefly, in the present invention we have found that if a hydrocarbon consisting essentially of an alkylbenzene having an o-methylethyl configuration is passed over a platinum group metal catalyst under dehydrocyclization conditions while in the presence of hydrogen and a small amount of ammonia good yields of indans will be obtained. By the inclusion of the ammonia in the system, we have found that the production of indans from such feedstocks can be about doubled and the dealkylation of the feed material reduced by about one-third over that wherein no ammonia is present.

More specifically, the present method of producing indans can be described as a process whereby a feedstock comprising alkylbenzenes conforming to the general formula:

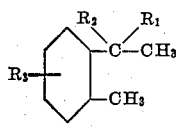

wherein $R_1$, $R_2$ and $R_3$ are selected from the group consisting of hyrogen and lower alkyl radicals, can be converted to the corresponding indans by passing the o-methylethyl benzene under dehydrocyclization conditions over a hydrogenation-dehydrogenation catalyst such as a platinum group metal catalyst containing a small amount, e.g. about 0.1 to 1.5% by weight, of a platinum metal, preferably about .3 to 0.6% supported on a solid absorptive carrier such as activated alumina, etc. The conditions for effecting dehydrocyclization are known in the art and can be as follows: temperatures in the range of about 750° to 1100° F., preferably about 850 to 1000° F.; pressures from atmospheric up to about 1000 p.s.i.g. and preferably about 50 to 500 p.s.i.g.; and a weight hourly space velocity (weight of feed per weight of catalyst per hour, WHSV) of about 0.1 to 10, preferably about 1 to 5. These reactions are usually conducted in the presence of free hydrogen maintained at about 1 to 20, preferably about 3 to 10, moles of hydrogen per mole of hydrocarbon. Although the above-described reaction conditions will yield the desired indan product, I have found that by the inclusion in the system of small amounts of ammonia, generally from about .01 to 5% and preferably about 0.05 to 1% based on the hydrocarbon feed the ultimate yields of indans will be greatly increased. The indans can be separated from the reaction product or the entire mixture can be dehydrogenated to yield the corresponding indenes.

Catalysts other than those of the platinum family type can be used under similar processing conditions to convert the alkylbenzenes to alkylindans if desired but we have found that the increased yields effected by the use of ammonia will result only if the catalyst be one selected from the platinum family. For instance, the inclusion of ammonia in a system employing a chromia type catalyst containing small amounts of magnesium oxide fails to improve the indan yields obtainable in a similar system when no ammonia is used. Table I below shows the results of two runs using in the presence of free hydrogen a chromia-alumina catalyst containing about 3% magnesium therein. The run notated "Run 2" had about .2% ammonia incorporated in the feedstock. The feedstock for both of these runs consisted of about 9.8% 1,3-dimethyl-2-ethyl benzene, 49.8% 1,3-dimethyl-4-ethyl benzene, 30.6% 1,4-dimethyl-2-ethyl benzene and 9.8% 1,3-dimethyl-5-ethyl benzene. This feedstock was passed over 192 grams of the chromia-alumina catalyst under the conditions indicated in Table I below.

Table I

| Run No. | (1) | (2) |
|---|---|---|
| Conditions: | | |
| Temperature, °F | 995 | 995 |
| Pressure, p.s.i.g | Atm. | Atm. |
| WHSV | 0.44 | 0.5 |
| Ammonia in feed_____percent | | 0.2 |
| Products (weight percent feed) corrected to 100% basis: | | |
| Liquid recovery | 88.4 | 90.5 |
| Dry gas ($C_3-$) | 3.4 | 2.6 |
| Carbon on catalyst | 8.1 | 6.9 |
| Product distribution (weight percent feed): | | |
| Toluene | | |
| Xylenes | 7.9 | 6.4 |
| $C_9$ aromatics | 12.4 | 12.6 |
| $C_{10}$ aromatics | 59.1 | 62.0 |
| Methylindans+ | 9.1 | 9.0 |

Similar tests were run using a platinum activated alumina catalyst containing 0.35% platinum rather than the above chromia-alumina catalyst. The activated alumina was made by calcining an alumina hydrate containing about 65 to 95% of trihydrate with the remainder being amorphous hydrous alumina or alumina monohydrate. In these runs a feedstock consisting essentially of about 65% 1,3-dimethyl-4-ethyl benzene and 35% 1,3-dimethyl-2-ethyl benzene was passed over about 70 grams of the platinum-alumina catalyst at the conditions indicated in Table II below.

Table II

| Run No. | (1) | (2) |
|---|---|---|
| Conditions: | | |
| Temperature, °F | 925 | 925 |
| Pressure, p.s.i.g | 50 | 50 |
| WHSV | 0.80 | 0.80 |
| $H_2/H'C$ mole ratio | 9.0 | 9.0 |
| Ammonia_____percent | | 0.2 |
| Products (weight percent feed) corrected to 100% basis: | | |
| Liquid recovery | 90.4 | 91.5 |
| Dry gas ($C_3-$) | 6.1 | 3.8 |
| Carbon on catalyst | 3.5 | 4.7 |
| Product distribution (weight percent feed): | | |
| Toluene | 0.6 | 0.6 |
| Xylenes | 19.6 | 10.7 |
| $C_9$ aromatics | 9.7 | 6.5 |
| $C_{10}$ aromatics | 51.6 | 55.8 |
| Methylindans | 9.0 | 18.0 |
| Hydrocracking | 39.4 | 26.2 |
| Dry gas—$C_2/C_1$ mole ratio | 1.4/1 | 1.1/1 |

Inspection of Table II will reveal that the production of indans is doubled by the addition of about .2% ammonia to the feedstock when the catalyst is of the platinum metal type. This effect was not obtained with the chromia catalyst, see Table I. It is to be further noted that a comparison of Tables I and II, indicates that the yields of indans are substantially the same when either the platinum or chromia catalyst is utilized when no ammonia is present in the system.

We claim:

1. In a process for producing indans the step which comprises subjecting an o-ethylmethyl benzene to dehydrocyclization conditions while in the presence of hydrogen, a platinum group metal hydrogenation-dehydrogenation catalyst and a small amount of ammonia effective to increase the production of the corresponding indan.

2. The process of claim 1 in which the catalyst is platinum activated alumina.

3. A process as described in claim 1 wherein ammonia is present in an amount of about .05 to 1% based on the o-ethylmethyl benzene.

4. In a process for producing indans the step comprising subjecting an o-ethylxylene to dehydrocyclization conditions at a temperature of about 850 to 1000° F. while in the presence of hydrogen, about 0.05 to 1% of ammonia based on the xylene and a platinum activated alumina catalyst to produce the corresponding indan.

References Cited in the file of this patent

UNITED STATES PATENTS

| | | |
|---|---|---|
| 2,531,328 | Elwell | Nov. 21, 1950 |
| 2,717,230 | Murray | Sept. 6, 1955 |
| 2,849,377 | Ogburn et al. | Aug. 26, 1958 |
| 2,872,492 | Donaldson et al. | Feb. 3, 1959 |

OTHER REFERENCES

Braude et al.: Chemical Abstracts, vol. 49, 1955, p. 13151 only.